June 23, 1964 J. C. GARRETT 3,138,417

INTERCEPT STRAPPING BRIDGE

Filed Jan. 17, 1963 2 Sheets-Sheet 1

INVENTOR.
Jim C. Garrett

BY C. A. Gulbrandsen

ATTY.

June 23, 1964 J. C. GARRETT 3,138,417

INTERCEPT STRAPPING BRIDGE

Filed Jan. 17, 1963 2 Sheets-Sheet 2

INVENTOR.
Jim C. Garrett

BY C. A. Gulbrandsen

ATTY.

United States Patent Office 3,138,417
Patented June 23, 1964

3,138,417

INTERCEPT STRAPPING BRIDGE

Jim C. Garrett, Huntington Park, Calif., assignor to Automatic Electric Laboratories, Inc., Northlake, Ill., a corporation of Delaware Filed Jan. 17, 1963, Ser. No. 252,247
1 Claim. (Cl. 339—17)

My invention relates in general to an improved intercept strapping bridge for use in telephone systems, and more specifically to a strapping bridge by means of which a telephone line which has been moved to a new number or disconnected, may be readily cross-connected to an intercept operator.

It is common practice in automatic and non-automatic telephone systems to provide a terminal block having a plurality of rows of terminals, usually six in each row, three of each row being assigned to a particular telephone number and connected on one side to the telephone line and on the other side to the connector switch contacts of the switching system. The other three terminals of the block are connected to an intercept operator on one side of the block and normally free of connections on the other side. When a line is moved from one location to another or is taken out of service, the telephone line is disconnected from the one side of the block and the three line terminals are cross-connected to the three intercept operator terminals so that subsequent incoming calls will be routed to the intercept operator and the proper information can be given to the calling party.

The improved strapping bridge of my invention comprises a thin strip of insulating material with a series of six contacts mounted on one side thereof by means of rivets or eyelets of conducting metal with a raised tongue of insulating material formed in the center of the front surface of the strip and having a printed circuit formation on the back of the strip connected to the rear ends of the rivets or eyelets in such a manner that the contacts are connected together in pairs. When the strip is forced down over a row of the terminals of the block, the three line terminals of the block are rigidly connected to the three terminals connected to the intercept operator.

The strapping bridge of my improved design has a number of features which aid in providing a compact bridge with contacts having strong gripping action when forced over the terminals of the block. The contacts are shortened by having the upper ends bent around forward in almost a complete circle with tension to cause a positive grip on the terminals and with a curved depression back of each contact so that the back of the curved portion thereof rests in one of said depressions and has free movement therein.

Further features of my invention will be apparent from the following detailed description made in conjunction with the accompanying drawings in which.

Figure 1:
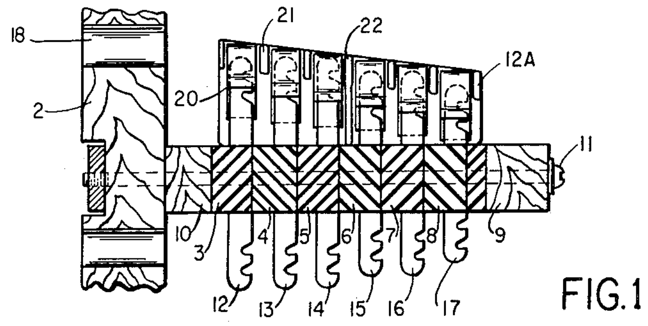
FIG. 1 is a front view partly in section of a terminal block showing only one row of the terminals thereof and my improved strapping bridge in place on said row of terminals.

Referring to FIG. 1 I have shown only the essential parts of a standard form of terminal block which comprises the fanning strip 2 with a series of insulating separators 3, 4, 5, 6, 7 and 8 mounted thereon between wood strips 9 and 10 by means of bolts such as 11. Mounted in slots in separators 3 etc. are the series of terminals 12, 13, 14, 15, 16 and 17 representing one telephone line, and there are in practice a number of such rows of terminals mounted in the separators in rows back of the row shown. The rows of terminals each represent a different telephone line or number and the rows of terminals are as close together as possible, usually about $\frac{3}{16}$ of an inch apart. There are a series of holes such as 18 through which the jumper wires may be passed to connect them to the various terminals of the block. In this FIG. 1 I have shown the strapping bridge **12*a*** of my design in place on top of the row of terminals and its functions will be explained.

Figure 2:
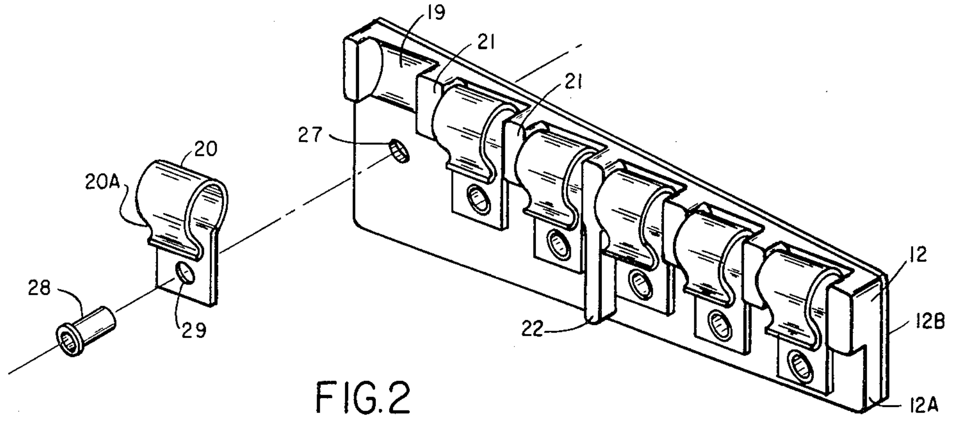
FIG. 2 is a perspective view taken from the front of a strapping bridge with one of the contact springs and its metallic rivet or eyelet shown removed from the bridge to illustrate the manner of assembly.
Figure 3:
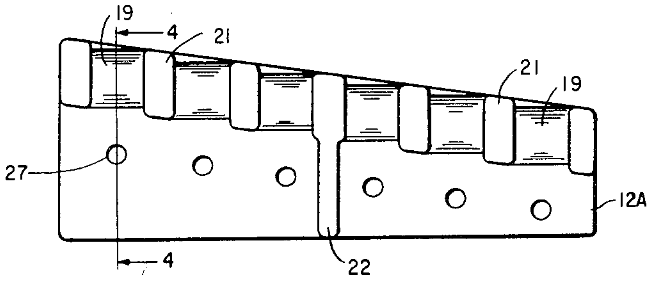
FIG. 3 is a front view of the frame or insulating portion of the bridge before the contact springs are assembled thereon.
Figure 4:
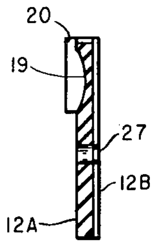
FIG. 4 is a sectional view of the back plate shown in FIG. 3 taken in the direction of the arrows along line 4—4.
Figure 5:
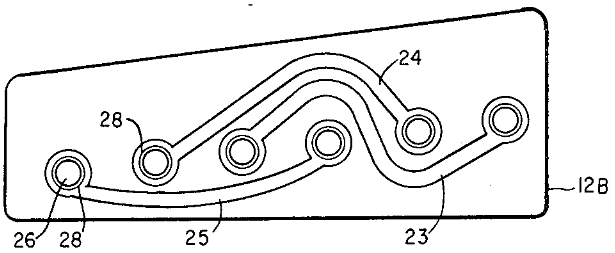
FIG. 5 is a back view of the strapping bridge showing the printed circuit links by means of which the contact springs are connected together in pairs.
Figure 6:
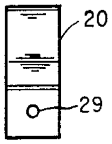
FIGS. 6 and 7 are front and side views respectively of the contact spring.
Figure 7:
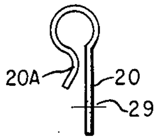

Referring now to FIGS. 2 to 7 inclusive, the strapping bridge comprises a plate **12*a* formed of any plastic such as lucite or polystyrene with a thin backing 12*b* also of an insulating material with a printed circuit formed thereon as shown in FIG. 5. The front and back plates are rigidly held together as though molded in one piece. The front plate 12*a* is molded as clearly shown in FIGS. 2, 3 and 4, with a series of curved recesses such as 19 each for receiving the curved back of a contact spring such as 20 and with raised bosses such as 21 between each pair of recesses. In the center of the bridge is a tongue 22 raised up integral with the bridge and located so as to provide a guide to pass between the center two terminals 14 and 15 of the terminal block when the bridge is pressed down thereon. Each contact spring is formed as shown in FIGS. 2, 6 and 7 with the upper end curved first backward and then around forward into almost a complete circle and with the end 20*a* curved outward to facilitate its being forced over the upper end of terminals 12** etc. of the block.

Referring to FIG. 5 I have shown the printed circuits formed on the back **12*b* of the bridge. The embodiment shown consists of three copper strips 23, 24 and 25 which are inserted in the plastic 12*b*, flush with its outer surface. Each strip is approximately 0.005 inch thick and approximately 0.0625 inch in width and each has a hole such as 26 in each end thereof registering with corresponding holes such as 27 extending through plastic parts 12*a* and 12*b*** as shown in FIG. 2.

Referring to FIG. 2, I have shown how the contact springs 20 are mounted on bridge **12*a*. Each contact has its curved back portion lying in one of the depressions such as 19 and the hole 29 thereof registering with the hole 27 in the bridge. The rivet 28 of conductive material is passed through hole 29 in the contact spring, through hole 27 in the plastic parts and through the hole 26 in one end of printed circuit strip 24, and the rear end of the rivet is turned over and tightly riveted in the back of the plate against the end of the copper printed circuit as shown in FIG. 5. In this manner each printed circuit link is secured at each end conductively to one of the spring contacts 20**. In the embodiment shown the first contact on the right is connected to the fourth from the right, the second to the fifth, and the third to the sixth. Any other type of linkage may be used as desired.

As shown in FIG. 1, when this bridge is pressed down over the terminals of one of the rows on the block, the contact springs 20 slip over the upper ends of terminals 12 to 17 inclusive and each terminal is tightly gripped by the upper curved part 20*a* of each contact spring 20. The curved part of each spring 20 has tension to insure a firm contact and has free movement in and out of the depressed circular portion 19.

Figure 8:
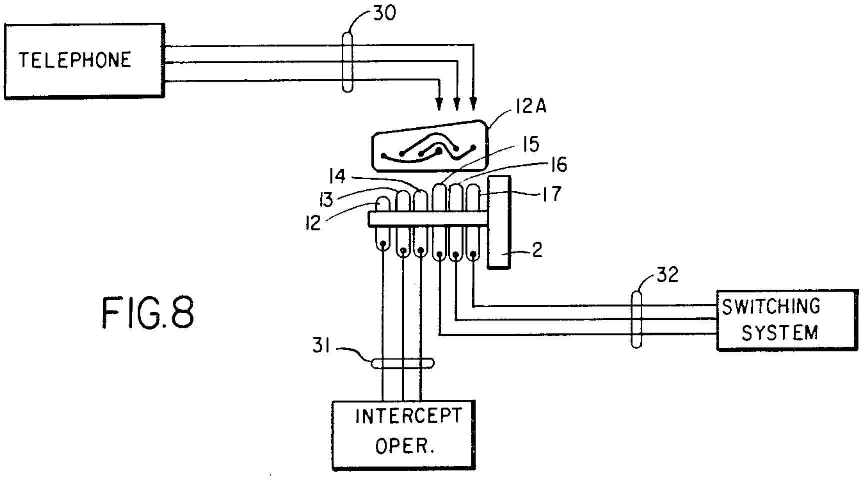
FIG. 8 is a diagrammatic view showing the wiring connections of a line terminal block and the strapping bridge in relation thereto.

Referring to FIGURE 8 I have shown the manner in which the terminals of the block are wired and the manner in which the strapping bridge links the terminals when applied. Normally the telephone line 30 is connected to upper three ends of terminals 15, 16 and 17, the intercept operator's line 31 is connected to the lower ends of terminals 12, 13 and 14, and the line 32 from the telephone exchange is connected to the lower ends of terminals 15, 16 and 17. When a line is removed from service or to another location, then line 30 is disconnected, as shown, from terminals 15, 16 and 17 and the bridge 20 is pressed down on the terminals to thereby connect the line 32 to the line 31 to the intercept operator's position.

Having fully described the features and aspects of my invention, what I consider to be new and desire to have protected by Letters Patent, will be pointed out in the appended claim.

What I claim is:

The combination with a telephone terminal block having a row of double-ended terminals with the lower end of one group of said terminals connected to one point and the lower end of another group of said terminals connected to another point, the upper ends of said one group projecting above said block a certain distance and the upper ends of said other group projecting above the block a different distance, of a strapping bridge for attachment to the upper ends of said terminals comprising a thin narrow strip of insulating material with a plurality of printed-circuit links embedded in the rear surface thereof and a series of contact springs mounted on the front surface thereof, one end of each link connected to one of said contact springs by a connection through said material, the upper edge of said strip being slanted so that the bridge has a greater height at one end than the other to correspond to the height of said groups of terminals, a series of curved depressions along the upper front face of said material adjacent said slanted edge, each spring having its upper end curved backward and then around forward into an almost complete circle with the curved-back portion lying in one of said depressions and freely movable therein, said bridge when pressed downward over the upper ends of said groups of terminals causing said contact springs and links to connect said terminals together in pairs and to cause said slanting top to lie just above all of said contact springs and said terminals.

References Cited in the file of this patent

UNITED STATES PATENTS

| | | |
|---|---|---|
| 1,913,871 | Connell et al. | June 13, 1933 |
| 2,849,700 | Perkin | Aug. 26, 1958 |
| 2,925,645 | Bell et al. | Feb. 23, 1960 |

FOREIGN PATENTS

| | | |
|---|---|---|
| 535,610 | Great Britain | Apr. 16, 1941 |